United States Patent
Oster et al.

(10) Patent No.: US 6,292,746 B1
(45) Date of Patent: *Sep. 18, 2001

(54) PROCESS FOR THE SPECIFICATION OF POSITION DATA

(75) Inventors: Martin Oster, Königsbrunn; Peter Weisbier; Günter Schiehser, both of Vienna, all of (AT)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,612

(22) Filed: Dec. 9, 1998

(30) Foreign Application Priority Data

Dec. 10, 1997 (DE) .............................. 197 54 786

(51) Int. Cl.⁷ .................................................. G06F 7/00
(52) U.S. Cl. ........................................... 701/209; 701/19
(58) Field of Search ....................... 701/209, 200, 701/201, 202, 206, 208, 117, 19, 20; 340/988, 990, 995; 73/178 R

(56) References Cited

U.S. PATENT DOCUMENTS

| | | | | |
|---|---|---|---|---|
| 3,553,449 | * | 1/1971 | Hathaway | 246/3 |
| 3,598,990 | * | 8/1971 | Convey | 246/182 AA |
| 4,066,228 | * | 1/1978 | Elder | 246/5 |
| 4,538,521 | * | 9/1985 | Fastenau | 104/118 |
| 4,862,807 | * | 9/1989 | Guadagno | 104/130 |
| 5,371,678 | * | 12/1994 | Nomura | 701/209 |
| 5,623,413 | * | 4/1997 | Matheson et al. | 701/117 |
| 5,669,587 | * | 9/1997 | Van Alstine et al. | 246/220 |
| 5,671,680 | * | 9/1997 | DelGreco | 104/130.07 |
| 5,794,172 | * | 8/1998 | Matheson et al. | 701/117 |
| 5,828,979 | * | 10/1998 | Polivka et al. | 701/117 |
| 5,893,898 | * | 4/1999 | Tanimoto | 701/201 |
| 5,905,451 | * | 5/1999 | Sakashita | 701/201 |
| 5,951,622 | * | 9/1999 | Nomura | 701/212 |
| 5,978,733 | * | 11/1999 | Seshimaru et al. | 701/201 |
| 6,014,607 | * | 1/2000 | Yagyu et al. | 701/209 |
| 6,023,652 | * | 2/2000 | Arakawa et al. | 701/201 |
| 6,023,655 | * | 2/2000 | Nomura | 701/208 |
| 6,026,346 | * | 2/2000 | Ohashi et al. | 701/201 |

FOREIGN PATENT DOCUMENTS

| | | |
|---|---|---|
| 39 05 493 A1 | 8/1990 | (DE) . |
| 38 28 725 C2 | 3/1991 | (DE) . |
| 290 074 A5 | 5/1991 | (DE) . |
| 41 04 351 A1 | 8/1991 | (DE) . |
| 43 26 237 C1 | 12/1994 | (DE) . |
| 44 06 721 A1 | 8/1995 | (DE) . |
| 195 08 486 A1 | 9/1996 | (DE) . |
| 195 32 104 C1 | 1/1997 | (DE) . |
| 196 11 915 A1 | 10/1997 | (DE) . |
| 0 457 064 A1 | 11/1991 | (EP) . |
| 0 715 285 A1 | 11/1991 | (EP) . |
| 0 471 405 A1 | 2/1992 | (EP) . |
| 0 494 499 B1 | 7/1992 | (EP) . |
| 0 702 209 A1 | 3/1996 | (EP) . |
| 0 756 153 A2 | 1/1997 | (EP) . |
| 0 763 808 A2 | 3/1997 | (EP) . |
| 2 281 141 A | 2/1995 | (GB) . |

* cited by examiner

Primary Examiner—Jacques H. Louis-Jacques
(74) Attorney, Agent, or Firm—Sughrue, Mion, Zinn, Macpeak & Seas, PLLC

(57) ABSTRACT

A process for the specification of position data, in particular geographic coordinates, for several routes of at least one vehicle. In order to reduce the necessary volume of data, the routes are divided into partial routes such that route sections that are common to at least two routes form common partial routes, with at least one point of each partial route being used for the specification of position data.

13 Claims, 3 Drawing Sheets

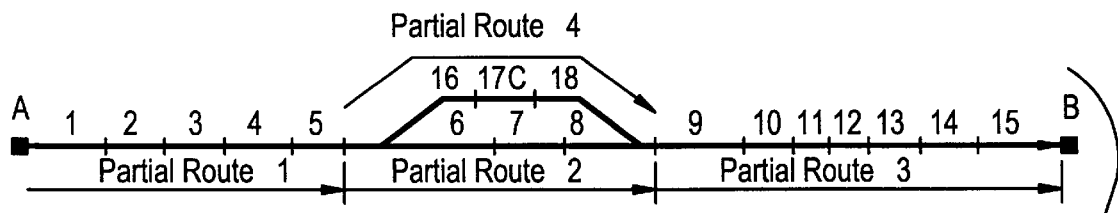

| Route of A - B | |
|---|---|
| Nr. | Data Group No. |
| 1 | Segment 1 |
| 2 | Segment 2 |
| 3 | Segment 3 |
| 4 | Segment 4 |
| 5 | Segment 5 |
| 6 | Segment 6 |
| 7 | Segment 7 |
| 8 | Segment 8 |
| 9 | Segment 9 |
| 10 | Segment 10 |
| 11 | Segment 11 |
| 12 | Segment 12 |
| 13 | Segment 13 |
| 14 | Segment 14 |
| 15 | Segment 15 |

| Route of A - B over C | |
|---|---|
| Nr. | Data Group No. |
| 1 | Segment 1 |
| 2 | Segment 2 |
| 3 | Segment 3 |
| 4 | Segment 4 |
| 5 | Segment 5 |
| 6 | Segment 16 |
| 7 | Segment 17 |
| 8 | Segment 18 |
| 9 | Segment 9 |
| 10 | Segment 10 |
| 11 | Segment 11 |
| 12 | Segment 12 |
| 13 | Segment 13 |
| 14 | Segment 14 |
| 15 | Segment 15 |

Route of A - B

| Nr. | Data Group No. |
|---|---|
| 1 | Partial Route 1 |
| 2 | Partial Route 2 |
| 3 | Partial Route 3 |

Route of A - B over C

| Nr. | Data Group No. |
|---|---|
| 1 | Partial Route 1 |
| 2 | Partial Route 4 |
| 3 | Partial Route 3 |

Partial Route 1

| Nr. | Data Group No. |
|---|---|
| 1 | Segment 1 |
| 2 | Segment 2 |
| 3 | Segment 3 |
| 4 | Segment 4 |
| 5 | Segment 5 |

Partial Route 3

| Nr. | Data Group No. |
|---|---|
| 1 | Segment 9 |
| 2 | Segment 10 |
| 3 | Segment 11 |
| 4 | Segment 12 |
| 5 | Segment 13 |
| 6 | Segment 14 |
| 7 | Segment 15 |

Partial Route 2

| Nr. | Data Group No. |
|---|---|
| 1 | Segment 6 |
| 2 | Segment 7 |
| 3 | Segment 8 |

Partial Route 4

| Nr. | Data Group No. |
|---|---|
| 1 | Segment 16 |
| 2 | Segment 17 |
| 3 | Segment 18 |

FIG. 1

PROCESS FOR THE SPECIFICATION OF POSITION DATA

BACKGROUND OF THE INVENTION

The invention involves a process for specifying position data for several routes, in particular vehicle routes. For fleet management, particularly in the area of local public transit, it is necessary to have available precise position data of the route to be driven. For example, the activation points for the triggering of LSA (light-signal-system) telegrams for priority switchover of traffic signal systems must be reproducible with tighter tolerances. Furthermore, the position data can also be used to control an optic and/or acoustic stop (i.e., bus stop or metro stop) signaling inside the vehicle as well as for the triggering of an arrival indication at the bus stops prior to arrival. Depending on the position of the vehicle at a particular point in time, a specific waiting time would result at the individual stops. This projected waiting time can be indicated, for example, as "Arrival in XY minutes". Position data are also used to determine adherence to the route schedule. By comparing the reference position data to the actual position data, deviation from schedule—later or earlier—can be determined in a simple way, and can be signaled to the driver, and possibly to the riders.

The position data management for several routes has previously occurred separately for each individual route. Essentially equidistant position data is determined for each route. Junctions or co-uses of position data of other routes are also not provided for if the routes only deviate from one another in a small partial section. The volume of data is correspondingly large. The low flexibility with regard to route changes is furthermore disadvantageous, in particular for the necessity of bypass sections.

SUMMARY OF THE INVENTION

The invention is based on the task of specifying a process of the generic type in which the volume of data required is reduced, and which is characterized through flexibility in terms of simpler adjustability to changed conditions.

The task is resolved according to the invention by dividing the routes up into partial routes, such that route sections that are common to at least two routes form common partial routes in which at least one point of each partial route is used for specifying position data. Through the introduction of common partial routes, which are managed to an extent as a data record for several routes, a considerable reduction of the volume of data to be stored results.

In an advantageous embodiment, the beginning point and/or the end point of each partial route is used for specifying of position data, whereby the quantity of data is reduced to a maximum of only two position data records each for each partial route of the entire line. Therefore it is sufficient if only the first, or the last, partial route is also characterized by the starting point, or end point. Except for this one partial route, the remaining partial routes are clearly defined by only their starting, or end point. All partial routes can be used simultaneously as a data basis for additional routes, since the beginning and end point of the common partial routes are accepted. With intermediate partial routes, the starting or end points of neighboring partial routes can be referenced.

Especially interesting is a process in the case of rail-bound routes, wherein the position of switchpoints is used for specifying position data. Since, for example, a streetcar system is limited to fixed routes that are predetermined by the rail network, partial routes can each be defined in a simple way between two switchpoints. Branch lines that form the starting point, or the end point of various partial routes, are thus clearly identified.

Bypass lines can also be integrated into the partial route formation without a problem. Therefore, the volume of data to be managed can be kept lower if the partial routes that form the bypass routes, are already known at least in part from other routes.

The position data can be managed according to the specific route, by entering the position data into a database preferably of a central control unit but also or alternatively into an on-board computer of the vehicle. If entered into a central control unit, the data can be made available to the vehicles traveling on the corresponding route by means of a mobile data storage unit, e.g., the position data of a route, including by-pass(es) when applicable, can be entered into the on-board computer of the vehicle by means of a magnetic card or a disc. Route plan specifications, in some cases with incorporation of planned bypass lines can be very flexibly converted in this way.

Therefore, the position data of a route, including by-pass (es) where applicable, can be entered into a respective mobile data storage medium for each route. Each vehicle that travels on the corresponding route can thus be quickly supplied with the required position data and alongside other vehicles. For example, before starting his/her route the driver can load the position data of the particular route assigned to him/her into the onboard computer by means of a magnetic card, disc or similar medium that goes with this route.

BRIEF DESCRIPTION OF THE DRAWINGS

The invention will be more clearly understood with reference to the following description in conjunction with the accompanying drawings, in which FIG. 1 schematically shows a route distribution in connection with explanatory tables

DETAILED DESCRIPTION OF THE INVENTION

Illustrated in FIG. 1 are two routes that differ from one another only in a middle section C. Partial routes 1 and 3 are common to both lines, while in the middle section C, each route has its own partial route 2, or 4. Both routes connect a beginning point A and an endpoint B and consist of 15 segments each, or 3 partial routes each, whereby the segment distribution can be conducted in reference to the stops. Both of the upper tables show the data management according to the prior art. It is obvious that both routes are treated as completely separate and independent from one another. The lower tables characterize the claimed process, in which a partial route management is introduced. The partial routes 1 and 3 are the same for both routes. The exact combination of the partial routes is given in the 4 lowest tables. These can be referred to in route planning and route management. The savings potential with regard to the data maintenance is very considerable, in particular with very complex line management, in which the same partial routes are used by different routes.

Figure 2:
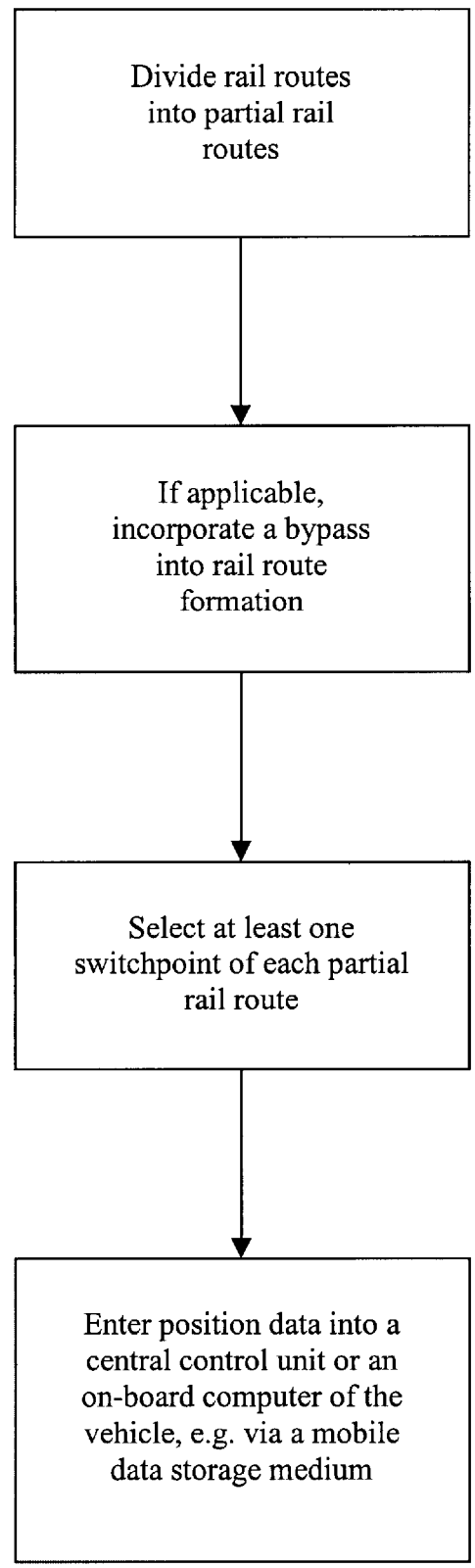
FIG. 2 depicts a flowchart of an exemplary method according to the invention for a rail-bound system.
Figure 3:
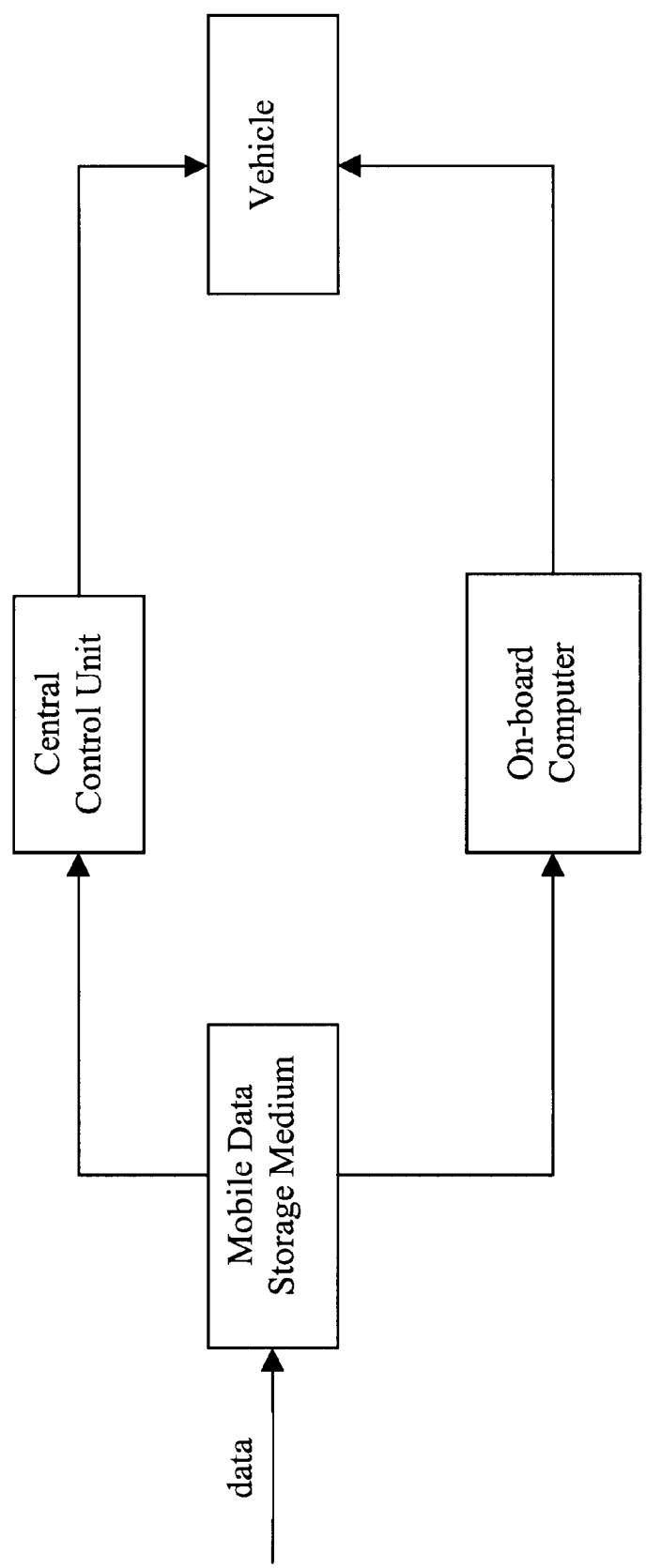
FIG. 3 shows an exemplary schematic diagram of a central control unit, an on-board computer, and a mobile data storage medium according to one embodiment of the invention.

FIG. 2 shows the steps of an exemplary method according to the invention for a rail-bound system. First, rail routes a vehicle travels in the rail-bound system are divided into partial rail routes. If applicable, bypasses are incorporated into the rail route formation. Next, at least one switchpoint of each of the partial rail routes is selected to specify position data. The position data are entered into a central control unit or an on-board computer of the vehicle via, for example, a mobile data storage medium, as shown in FIG. 3. The invention is not limited to the embodiment described above. Rather, a number of variants that make use of the features of the invention are possible, even in a fundamentally different type of embodiment.

What is claimed is:

1. A process for specifying position data of several rail routes of at least one vehicle traveling in a rail-bound system, comprising:

dividing said rail routes into partial routes, wherein rail route sections that are common to at least two of said rail routes form common partial rail routes; and selecting no more than two switchpoints of each of said partial rail routes for specifying the position data of the partial rail routes.

2. The process according to claim 1, wherein at least one bypass is incorporated into the partial rail route formation.

3. The process according to claim 1, further comprising the step of entering the position data into at least one of a central control unit and an on-board computer of the vehicle.

4. The process according to claim 3, wherein the position data of said rail routes including the at least one bypass when applicable is entered into the on-board computer of the vehicle by means of a mobile data storage medium.

5. The process according to claim 4, wherein the position data of said rail routes including the at least one bypass where applicable is entered into a respective mobile data storage medium for each route.

6. The process of claim 1, wherein the position data comprise geographical coordinates.

7. A method for reducing a data volume of identification data of a plurality of routes, comprising:

subdividing each of the routes into partial routes;

specifying at least one point in each of the partial routes to identify the respective partial route, the at least one point of each of the partial routes forming a data group for the respective partial route; and supplying a vehicle traveling on at least two routes of the plurality of routes with the data groups of the respective partial routes of the two routes, wherein, for each partial route of the two routes that is common to the two routes, only one respective data group is supplied to the vehicle.

8. The method according to claim 7, wherein at least one bypass is incorporated into the partial route formation.

9. The method according to claim 7, further comprising a step of entering the identification data into at least one of a central control unit and an on-board computer of the vehicle.

10. The method according to claim 9, wherein the identification data of the plurality of routes including at least one bypass, when applicable, is entered into the on-board computer of the vehicle by means of a mobile data storage medium.

11. The method according to claim 10, wherein the identification data of the plurality of routes including the at least one bypass, when applicable, is entered into a respective mobile data storage medium for each route.

12. The method according to claim 7, wherein the identification data comprise geographical coordinates.

13. The method according to claim 7, wherein the at least one point in each of the partial routes comprises a switchpoint.

* * * * *